(12) United States Patent
Sajadieh (10) Patent No.: US 9,014,091 B2
(45) Date of Patent: Apr. 21, 2015

(54) NETWORK ARCHITECTURE FOR DUAL ACTIVE PERSONAE CELLULAR MOBILE DEVICES

(71) Applicant: Intel Corporation, Santa Clara, CA (US)

(72) Inventor: Masoud Sajadieh, Freemont, CA (US)

(73) Assignee: Intel Corporation, Santa Clara, CA (US)

( * ) Notice: Subject to any disclaimer, the term of this patent is extended or adjusted under 35 U.S.C. 154(b) by 115 days.

(21) Appl. No.: 13/625,127

(22) Filed: Sep. 24, 2012

(65) Prior Publication Data

US 2014/0086154 A1    Mar. 27, 2014

(51) Int. Cl.
*H04W 4/00*     (2009.01)
*H04W 72/04*    (2009.01)
*H04W 8/18*     (2009.01)

(52) U.S. Cl.
CPC ............ *H04W 72/0493* (2013.01); *H04W 8/18* (2013.01)

(58) Field of Classification Search
None
See application file for complete search history.

(56) References Cited

U.S. PATENT DOCUMENTS

| | | | |
|---|---|---|---|
| 2010/0296419 A1 | 11/2010 | Kim et al. | |
| 2012/0224652 A1 | 9/2012 | Chen et al. | |
| 2013/0272251 A1* | 10/2013 | Schmidt et al. | 370/329 |
| 2013/0301529 A1* | 11/2013 | Lindsay et al. | 370/328 |
| 2014/0086154 A1* | 3/2014 | Sajadieh | 370/329 |
| 2014/0086159 A1* | 3/2014 | Sajadieh et al. | 370/329 |

FOREIGN PATENT DOCUMENTS

| | | |
|---|---|---|
| WO | WO-2010065430 A2 | 6/2010 |
| WO | WO-2013085541 A1 | 6/2013 |

OTHER PUBLICATIONS

"Part 11: Wireless LAN Medium Access Control (MAC) and Physical Layer (PHY) Specifications: Amendment 4: Enhancements for Very High Throughput for Operation in Bands below 6 GHz", IEEE Std 802.11ac. Local and metropolitan area networks. IEEE Computer Society., (2013), 425 pgs.

"3GPP Specification Status Report", [online]. Retrieved from the Internet: <URL: http://www.3gpp.org/ftp/Specs/html-info/status-report.htm>, (Accessed on Oct. 30, 2013), 525 pgs.

"cdma2000 Wireless IP Network Standard", TIA-835-C (Revision of TIA-835-B), (Aug. 2003), 248 pgs.

"General Packet Radio Service (GPRS) enhancements for Evolved Universal Terrestrial Radio Access Network (E-UTRAN) access", 3GPP TS 23.401 V10.5.0 (Sep. 2011) Technical Specification Group Services and System Aspects (Release 10), (Sep. 2011), 282 pgs.

(Continued)

*Primary Examiner* — Robert Wilson
(74) *Attorney, Agent, or Firm* — Schwegman Lundberg & Woessner, P.A.; Eric S. Hiponia (57) ABSTRACT

A communication device for providing dual-active personae using a single subscriber identification module. A long term evolution (LTE) protocol stack, maintained in the memory, defines a layered data structure for transmitting and receiving data. A single subscriber identification module provides data for a first persona and a second persona. A processor is coupled to the single subscriber identification module and memory and implements, on the single communication device, first virtual user equipment (vUE) associated with the first persona and second vUE associated with the second persona using virtual LTE protocol stacks for each vUE supported by the single subscriber identification module.

19 Claims, 6 Drawing Sheets

(56) References Cited

OTHER PUBLICATIONS

"General Packet Radio Service (GPRS) enhancements for Evolved Universal Terrestrial Radio Access Network (E-UTRAN) access", 3GPP TS 23.401 V12.0.0 (Mar. 2013) Technical Specification Group Services and System Aspects (Release 12), (Mar. 2013), 290 pgs.

"International Application Serial No. PCT/US2013/044507, International Search Report mailed Jul. 31, 2013", 3 pgs.

"International Application Serial No. PCT/US2013/044507, Written Opinion mailed Jul. 31, 2013", 4 pgs.

"Part 11: Wireless LAN Medium Access Control (MAC) and Physical Layer (PHY) Specifications", IEEE Std 802.11. Local and metropolitan area networks. IEEE Standards Association. IEEE Computer Society., (Mar. 29, 2012), 2973 pgs.

"Part 11: Wireless LAN Medium Access Control (MAC) and Physical Layer (PHY) Specifications: Amendment 3: Enhancements for Very High Throughput in the 60 GHz Band", IEEE Std 802.11ad. Local and metropolitan area networks. IEEE Computer Society., (Dec. 28, 2012), 628 pgs.

"Part 11: Wireless LAN Medium Access Control (MAC) and Physical Layer (PHY) Specifications: Amendment 5: Enhancements for Higher Throughput", IEEE Std. 802.11n. Local and metropolitan area networks. IEEE Computer Society., (Oct. 29, 2009), 536 pgs.

"Part 16: Air Interface for Broadband Wireless Access Systems: Amendment 2: Improved Coexistence Mechanisms for License-Exempt Operation", IEEE Std 802.16h. Local and metropolitan area networks. IEEE Computer Society. IEEE Microwave Theory and Techniques Society., (Jul. 30, 2010), 223 pgs.

"Part 16: Air Interface for Broadband Wireless Access Systems", IEEE Std 802.16. Local and metropolitan area networks. IEEE Computer Society. IEEE Microwave Theory and Techniques Society., (May 29, 2009), 2082 pgs.

"Part 16: Air Interface for Broadband Wireless Access Systems: Amendment 1: Multihop Relay Specification", IEEE Std 802.16j. Local and metropolitan area networks. IEEE Computer Society. IEEE Microwave Theory and Techniques Society., (Jun. 12, 2009), 314 pgs.

"Part 16: Air interface for broadband wireless access systems: Amendment 3: Advanced air interface", IEEE Std 802.16m. Local and metropolitan area networks. IEEE Computer Society. IEEE Microwave Theory and Techniques Society., (May 6, 2011), 1107 pgs.

"Policy and charging control architecture", 3GPP TS 23.203 V11.2.0 (Jun. 2011) Technical Specification Group Services and System Aspects (Release 11), (Jun. 2011), 142 pgs.

"Policy and charging control architecture", 3GPP TS 23.203 V12.0.0 (Mar. 2013) Technical Specification Group Services and System Aspects (Release 12), (Mar. 2013), 183 pgs.

\* cited by examiner

# NETWORK ARCHITECTURE FOR DUAL ACTIVE PERSONAE CELLULAR MOBILE DEVICES

BACKGROUND

Mobile devices are typically owned by individuals or a business (or enterprise) but are generally used for at least business and personal purposes. When used for business needs, specialized enterprise applications are executed. Such applications may also be used for personal use, e.g., email applications. This is especially the case with end devices such as "smart" mobile phones. Such use is applicable to other endpoints such as laptops, tablets, Internet devices, etc., which access similar enterprise services as well as virtualized desktops from a network cloud.

With rapid growth of smartphones, tablets, cloud computing, and ubiquitous wide-area communications, new usage models are arising where work-related, personal, entertainment, etc. activities are performed on a single mobile device. The proliferation of these devices has also made it possible to perform computer-related tasks in many places. Even further, highly portable, powerful computers with wireless connections are radically changing the way people think about and their use of computing devices. Users no longer limit their use to a single device. Different devices are often used based on what device best suit the user's current needs.

Nevertheless, mobile and other endpoint devices present a lingering problem because such end devices can be compromised in a way that inadvertently permits unauthorized users to gain access to sensitive data and information. For example, open wireless network interfaces allows external hackers and other adversaries to probe these devices for vulnerabilities, which can then lead to installation of rogue programs and/or the theft of data.

At each place a user works, the user runs applications, specifies preferences, and is allowed to access resources and files according to local rules. These elements, together with the name-to-resource mappings, can be referred to as a user's computing persona. Currently, a user's environment or computing persona is defined on each machine. Each machine has a single computing persona for each user and computing personae fbr a particular user typically vary from device to device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Persona-awareness is added to a radio sub-system to create a dual personality property with one UICC (Universal ICC) card or subscriber identity module (SIM) card. A SIM card is a physically secure device, e.g., an IC card (or "smart card"), that can be inserted and removed from the terminal equipment. A SIM card may be provided with one or more applications. Further, a SIM card may be provided with a dual personality property enabling additional features including providing dual-active operation for a single, individual user. A Single-SIM Dual-Active (SSDA) card provides virtualized user equipment (vUE) that maintains two personalities for dual-persona usage scenarios for a single, individual user, such as a corporate persona and a personal persona. Such SSDA card may be implemented by 3rd Generation Partnership Project (3GPP) Long Term Evolution (LTE) cellular systems.

Figure 1:
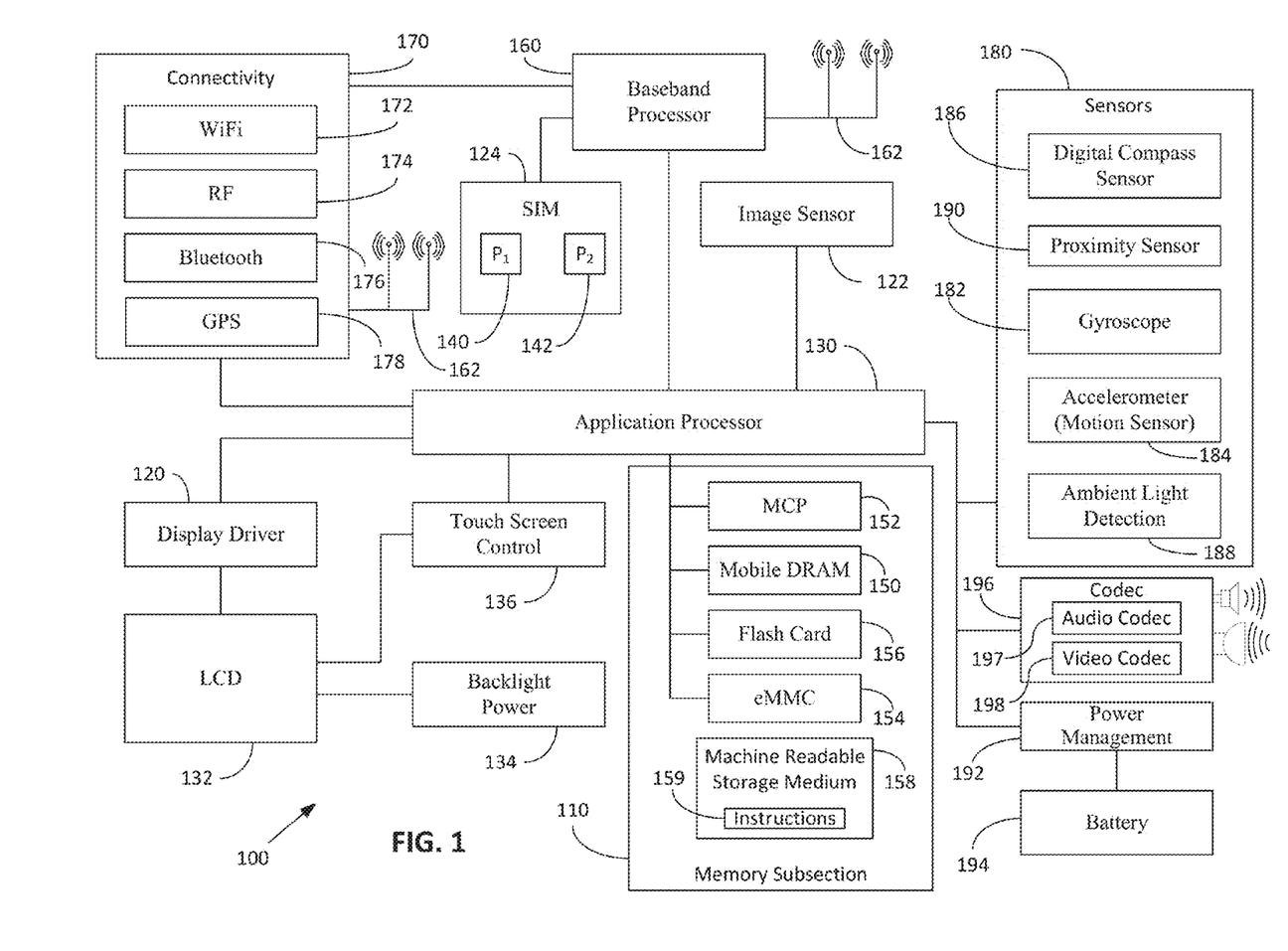
FIG. 1 illustrates a block diagram of a mobile device according to an embodiment.

FIG. 1 illustrates a block diagram of a mobile device 100 according to an embodiment. A mobile device 100 may include functions for implementing voice calls, text and multimedia messaging, entertainment, e.g., playback of stored music and FM radio, photography, etc. In FIG. 1, the mobile device 100 may include a memory subsection 110, the display driver circuit 120, the image sensor 122, and the subscriber identity module (SIM) card 124. The display driver circuit 120 is mapped to the application processor 130 and controls a liquid crystal display (LCD) 132 of the mobile device 100.

In an LCD 132, light is projected through the layer of liquid crystals and is colorized, which produces the visible image. The liquid crystals do no emit light themselves, so the LCD 132 requires backlight power 134 to illuminate the LCD 132 from the side or back of the display panel. The touch screen control 136 monitors the screen waiting for a touch. The touch screen control 136 obtains information from the LCD 132 and translates it into information for processing, such as cursor control, right and left clicks, etc. The image sensor 122 is provided to capture photographs and videos by converting an optical image falling on the image sensor 122 into an equivalent electrical signal for processing by application processor 130.

The SIM card 124 is a portable memory device that holds personal information of an account holder associated with the SIM card 124, including phone number, address book, text messages, and other data, A SIM card 124 according to an embodiment provides two or more personalities, e.g., $P_1$ 140 and $P_2$ 142, for multi-persona usage scenarios, such as corporate/personal. The Single-SIM Dual-Active (SSDA) SIM card 124 allows differentiation between two uses, such as one for social purposes and one for business purposes. This involves a shift in the directional nature of the person to persona relationship.

Several types of storage memory may be included in the memory subsection 110, such as mobile dynamic random access memory (DRAM) 1150, MCP (Multi Chip Package) 152, and embedded multimedia card (eMMC) 154. Mobile DRAM 150 is a version of DRAM memory that has been redesigned specifically for use in handheld, battery-powered communication devices, such as mobile phones, with the primary objective of reducing power consumption and extending the device's battery life. Mobile DRAM 150 is also known as Low Power Double Data Rate (LPDDR) RAM.

MCP 152, also known as MCM (multi-chip module), are packages where two or more chips are provided on a unifying substrate to facilitate their use as a discrete component. MCP 152 allows more surface mount area on devices. MCP 152 enables the rest of the application to view the memory subsection 110 as a unified "block", letting the memory subsection 110 over the highest levels of performance for the device.

The eMMC 154 is an embedded storage solution with an MMC interface, flash memory and controller, all in a small surface mount package. The eMMC 154 supports a wide range of applications in consumer electronics, wireless, and navigation. The eMMC 154 provides a host system with access to mass storage memory sub-systems with one common MMC interface protocol bus.

Another type of memory includes flash cards 156 that may be inserted into slots of the mobile device 100 to expand the available memory capacity. Flash cards 156 are a form of nonvolatile flash memory that may be used as removable storage media in mobile devices 100 as diverse as smartphones and other communication devices, digital still/video cameras, and personal media players (PMPs). In addition, portable computing devices, such as notebook computers, tablets, etc., usually provide interfaces to connect flash cards 156. Flash card 156 features are commonly implemented by an application processor 130.

The application processor 130 may be implemented as a SoC (System on a Chip). The application processor 130 is a microprocessor with a specialized architecture for deployment in embedded systems, such as digital still/video cameras, digital/smart TVs and set-top boxes, and automotive systems, and mobile devices 100. The application processor 130 supports applications running on the mobile device 100 by providing a self-contained operating environment that delivers system capabilities to support a device's applications, including memory management, graphics processing and multimedia decoding. The application processor 130 may be independent from other specialized processors in the same mobile device 100, such as a phone's baseband (wireless communications) processor 160.

The baseband processor 160 is programmed specifically for a predetermined baseband, or frequency range, the mobile device 100 is designed to use for communication. The predetermined baseband is the frequency range occupied by a message signal prior to modulation. The baseband processor 160 performs signal processing and implements the device's radio transmission operations. The baseband processor 160 modulates a higher frequency carrier wave with a baseband signal so that the resulting radio frequency (RF) signal may be transmitted via the antenna. The baseband processor 160 also acts to demodulate a received RF signal to extracting the information-bearing baseband signal from a modulated carrier wave.

Connectivity module 170 provides for connectivity between other devices using one or more communication technologies such as WiFi 172, radio frequency (RF) 174, Bluetooth 176, GPS 178, etc. The connectivity module 170 and/or the baseband processor 160 may include a plurality of antennas 162 to wirelessly communicate using at least one of single-input multiple-output (SIMO), multiple-input multiple-output (MIMO), or multiple-input single-output (MISO) techniques. Connectivity module 170 and/or baseband processor 160 may include a single transceiver that is coupled to the plurality of antennas 162. The connectivity module 170 is controlled through the application processor 130 and may use the baseband processor 160 for signal processing.

Sensors 180 may also be provided. Sensors 180 that may be embedded include a gyroscope 182, an accelerometer (motion) 184, a digital compass 186, an ambient light sensor 188, proximity sensor 190, etc. Embedded sensors 180 support the creation of personal, group, and community sensing functions.

A power management module 192 may be provided to adapt to changes in application load to minimize power consumption from a battery 194 under various operating loads. The power management module 192 may change the state of the device based on a detected activity level. For example, mobile device 100 may transition between a suspended state, an idle state and an active usage state.

A codec module 196 provides encoding and decoding thr audio and video signals. An audio codec 197 may be provided for encoding and/or decoding audio signals. A video codec 198 may also be provided for processing video signals using video compression or decompression for digital video. The codec module 196 encodes data streams or signals for transmission, storage or encryption, or decodes signals for playback or editing.

One or more of the techniques (e.g., methodologies) discussed herein may be implemented by the application processor 130. Further, white a single application processor 130 is illustrated, any collection of processors may individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, one or more computer systems (e.g., a standalone, client or server computer system) or one or more hardware processors (e.g., application processor 130) may be configured by firmware or software (e.g., instructions, an application portion, or an application) as a module that operates to perform specified operations.

Embodiments may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality which may be integrated (or "burned") onto the chip substrate as a single integrated circuit. Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems. Software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily configured (e.g., programmed) to operate in a specified manner or to perform part or all of any operation described herein. Considering examples in which modules are temporarily configured, each of the modules need not be instantiated at any one moment in time. For example, where the modules comprise a hardware processor configured using software, the hardware processor may be configured as respective different modules at different times. Software may accordingly configure a hardware processor, for example, to constitute a particular module at one instance of time and to constitute a different module at a different instance of time.

Storage medium may include one or more storage memories included in the memory subsection 110, which provide a machine readable storage medium 158 on which is stored one or more sets of data structures or instructions 159 (e.g., software) embodying or utilized by any one or more of the techniques or functions described herein. The instructions 159 may also reside, completely or at least partially, within the any storage memory included in the memory subsection 110 or within a hardware processor, such as application processor 130 during execution thereof by the application processor 130.

While the machine readable storage medium 158 is illustrated as a single medium, the term "machine readable medium" may include a single medium or multiple media (e.g., a centralized or distributed database, and/or associated caches and servers) configured to store the one or more instructions 159.

In addition to any of the storage memories shown in memory subsection 110, the term "machine readable storage medium" may include any medium that is capable of storing, encoding, or carrying instructions 159 for execution by the application processor 130 and that cause the application processor 130 to perform any one or more of the techniques of the present disclosure, or that is capable of storing, encoding or carrying data structures used by or associated with such instructions 159.

The instructions 159 may further be transmitted or received over a communications network through baseband processor 160 utilizing any one of a number of transfer protocols (e.g., frame relay, interact protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, or other protocols now known or later developed.

Figure 2:
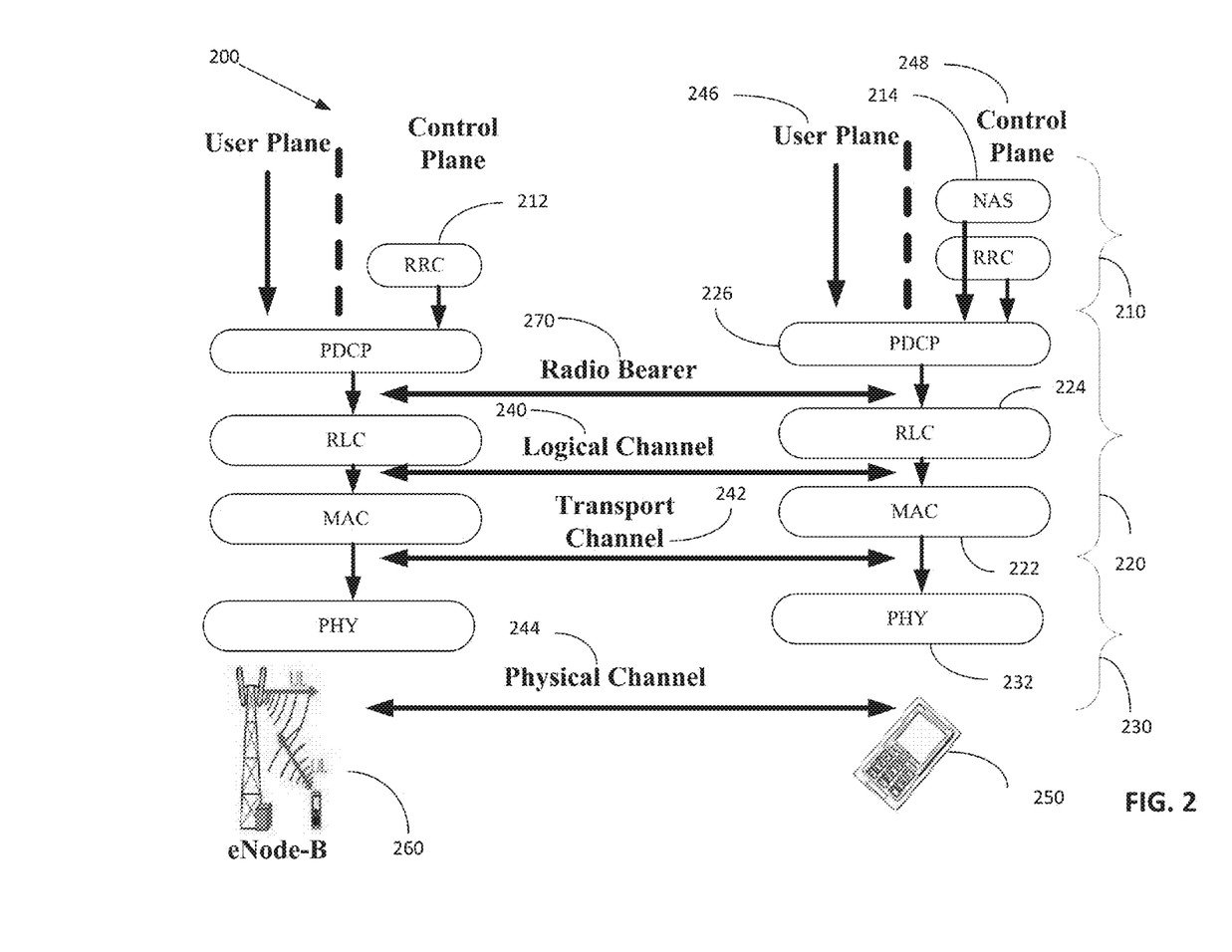
FIG. 2 illustrates a protocol stack between user equipment (UE) and Evolved Node B (eNode-B) according to the LTE standard specifications.

FIG. 2 illustrates a protocol stack 200 between user equipment (UE) 250 and Evolved Node B (eNode-B) 260 according to the LTE standard specifications. Layer 1 230, Layer 2 220 and Layer 3 210 set the services to organize the information to transmit through logical channels whose classifying parameter is the nature of the information they carry (i.e., control or traffic information) and map these logical channels into transport channels whose classifying parameter is how and with what characteristic the information within each logical channel is transmitted over the radio interface. Each of Layer 1 230, Layer 2 220 and Layer 3 210 are characterized by the services provided to the higher layers or entities and the functions that support them.

LTE channels may be categorized into three types of data channels. A logical channel 240 is defined by the type of information it carries. The logical channel 240 is classified into control and traffic channels. The transport channel 242 is defined by how and with what characteristics the information is transmitted. The physical channel 244 is defined by the physical resources used to transmit the data. Transport channels 242 are mapped onto physical channels 244. Data channels 240, 242, 244 are further divided into control channels and traffic channels. The traffic channels carry information of the user-plane 246, while the control channels carry information of the control-plane 248. The radio bearer channel 270 transports the packets of an evolved packet system (EPS) bearer, e.g., QoS (Quality of Service) flows, between a UE 250 and an eNode-B 260. The eNode-B provides LTE network access to the LTE 250. The UE 250 may be a wireless device, such as a cellular telephone.

LTE Layer 3 210 includes the Radio Resource Control (RRC) layer 212. The RRC layer 212 provides broadcast of system information; configures the Medium Access Control (MAC) 222, Radio Link Control (RLC) 224 and Packet Data Convergence Protocol (PDCP) 226 layers; carries out mobility functions and QoS management functions. Further, the RRC 212 is responsible for control plane signaling between UE 250 and the network. The RRC 212 takes care of the broadcasted system information related to the access stratum and transport of the non-access stratum (NAS) 214 messages, paging, establishment and release of the RRC 212 connection, security key management, handover, UE 250 measurements related to inter-system mobility, QoS, etc. The NAS 214 provides communication between the UE 250 and the mobility management entity (MME) on the network side (not shown) for control purposes, such as network attach, authentication, establishing and setting up bearers, and mobility management. The NAS 214 also performs authentication of the UE 250 and security control and generates part of the paging messages Layer 3 210 interfaces with layer 2 220 and also directly interfaces with layer 1 230, Layer 2 220 is split into the Media Access Control (MAC) 222, RLC 224 and PDCP 226. The MAC 222 provides addressing and channel access control mechanisms. The MAC 222 also manages hybrid automatic repeat request (HARQ) error correction, prioritization of the logical channels for the same UE 250 and dynamic scheduling between UEs 250, etc. The RLC 224 is used to format and transport traffic. Further, the RLC 224 transports the PDUs of the PDCP 226 and may work in one of three different modes depending on the reliability provided. Depending on this mode, the RLC 224 can provide automatic repeat query (ARQ) error correction, segmentation/concatenation of PDUs, reordering for in-sequence delivery, duplicate detection, etc. The PDCP 226 is responsible for (de-) compressing the headers of IP packets of the user plane. The PDCP 226 provides transport of data of the RRC 212 with ciphering and integrity protection and for the IP layer transport of the IP packets, with robust header compression (ROHC) header compression, ciphering, and, depending on the mode of the RRC 212, in-sequence delivery, duplicate detection, and retransmission of its own service data units (SDUs) during handover.

Layer 1 230 is the physical (PHY) layer 232 and provides the basic networking hardware transmission technologies of a network. The PEW layer 232 translates logical communication requests into hardware specific operations such as modulation, bit synchronization, multiplexing, equalization, forward error correction etc. The PHY layer 232 carries information from the transport channels 242 of the MAC 222 over the air interface, and handles the link adaptation modulation and coding (AMC), power control, cell search (for initial synchronization and handover purposes), and other measurements (inside the LTE system and between systems) for the RRC layer 212.

Figure 3:
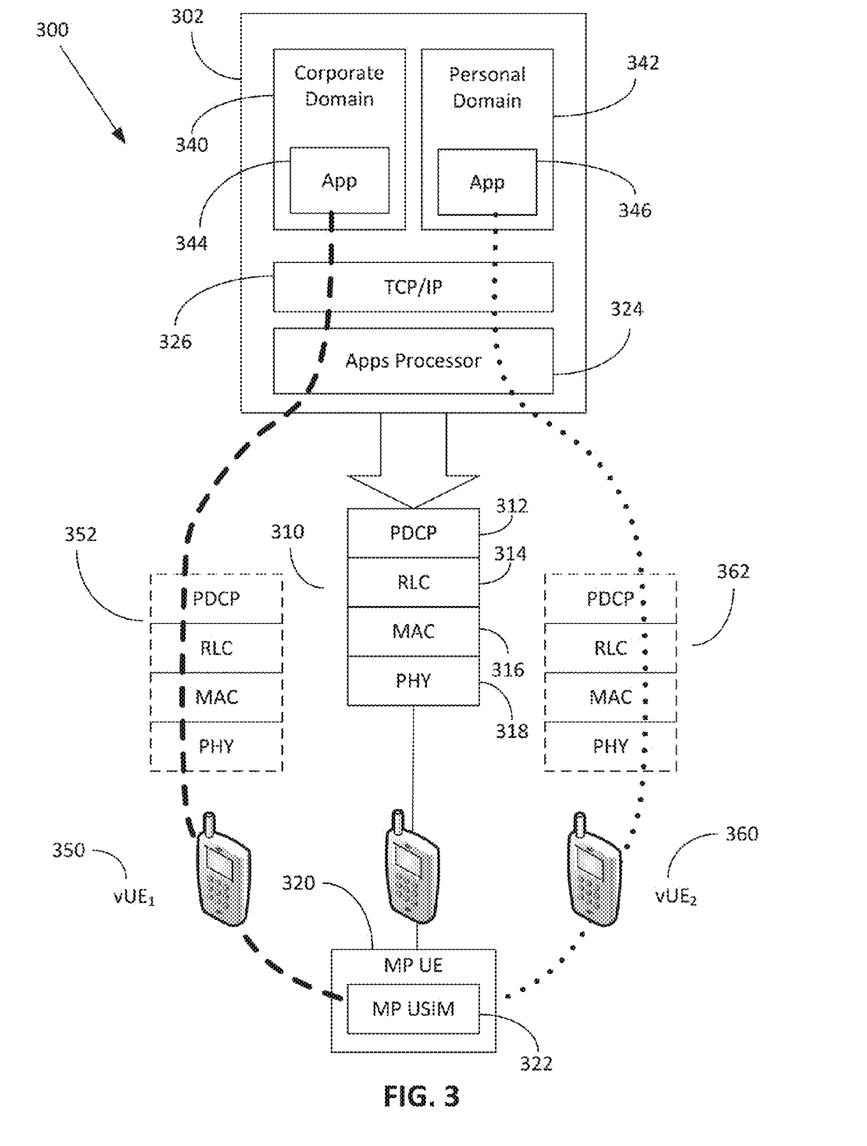
FIG. 3 illustrates the use of a Single-SIM Dual-Active (SSDA) card from the view of the UE according to an embodiment.

FIG. 3 illustrates the use of a Single-SIM Dual-Active (SSDA) card 300 from the view of the multiple persona user equipment (MP UE) 320 according to an embodiment. In FIG. 3, a long term evolution (LTE) protocol stack 310 is maintained in memory 302 to define a layered data structure for transmitting and receiving data. A single, individual user may have at least a first persona and a second persona, wherein the first persona may be a corporate persona and the second persona may be for personal use. A multiple persona (MP) universal subscriber identification module (SIM) 322 in a multiple persona user equipment (MP UE) 320 provides data for implementing at least the first persona and the second persona for a single, individual user on a mobile device 100, such as the MP UE 320.

A processor, such as an applications processor 324, implements, via the LTE protocol stack 352, first virtual user equipment ($vUE_1$) 350 associated with the first persona. Second virtual user equipment ($vUE_2$) 360 associated with the second persona is implemented via LTE protocol stack 362. The application processor 324 also provides communication using the Transmission Control Protocol/Internet Protocol (TCP/IP) protocol 326. By leveraging physical LTE protocol stack 310 and a Multiple-Persona (MP) USIM (Universal Subscriber Identity Module) 322, separate domains may be served for two or more personalities. In FIG. 3, a corporate domain 340 and a personal domain 342 having applications 344, 346 served by the MP-USIM 322.

For the SSDA card 300, personalities are activated and can communicate to their respective IP domains. Simultaneous operation may be supported with one transceiver (RF and modem) on the UE 320. This means the same UE 320 is used to serve the personae concurrently.

Two personae have individual and separate subscription profiles on one Multiple-Persona USIM (MP USIM) 322. MP USIM 322 is used for accessing services provided by mobile networks, which the applications 344, 346 are able to register with using the appropriate security. A single MP USIM 322 implies the same IMSI (International Mobile Subscriber Identity) for each persona. The IMSI is a globally-unique code number that identifies a subscriber to the network. The IMSI is linked to user account information with the carrier. The IMSI resides in the MP USIM card 322, which can be moved from one mobile terminal to another.

Radio QoS (Quality of Service) requests of applications spawned by each persona are managed in light of the significance and precedence of the multiple personae. Individual charging and billing are also supported for each persona so that charging and billing records may be provided. SSDA is neutral to various operating systems, and infrastructure-based security and protection solutions.

The LTE protocol stack 310 includes PDCP layer 312, RLC layer 314, MAC layer 316 and PHY layer 318. Using the MP USIM 322 and the multiple personae, the application processor 324 is able to service a first virtual user equipment ($vUE_1$) 350 through first virtual LTE protocol stack 352 and a second virtual user equipment ($vUE_2$) 360 through a second virtual LTE protocol stack 362.

Figure 4:
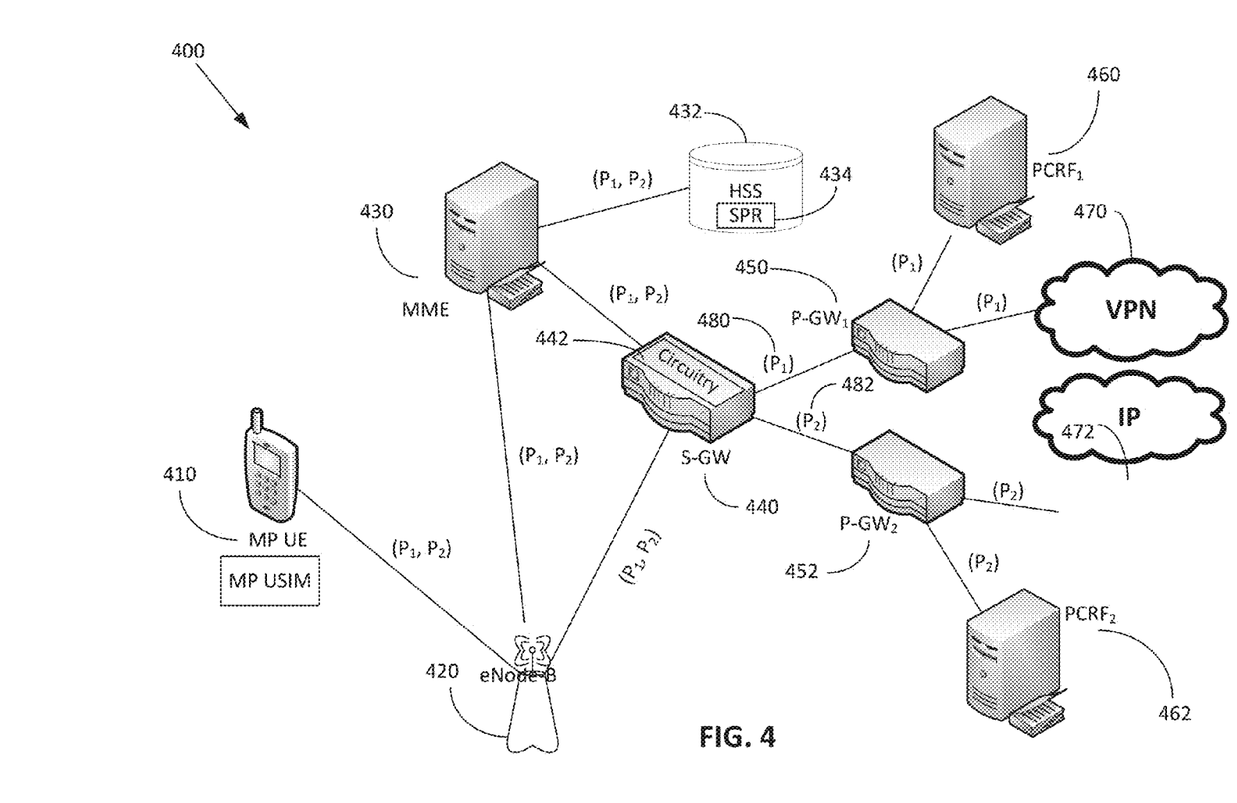
FIG. 4 illustrates a network architecture for a non-roaming network topology supporting SSDA operation according to an embodiment.

FIG. 4 illustrates a network architecture for a non-roaming network topology supporting SSDA operation 400 according to an embodiment. In FIG. 4, MP UE 410 is shown communicating with eNode-B 420. MP LTE 410 is one physical device. The eNode-B 420 is coupled to a mobility management entity (MME) 430 that provides bearer management functions to manage the control plane functions related to subscriber and session management. From that perspective, the MME 430 supports security features, e.g., end-user authentication, initiation and negotiation of ciphering, integrity protection algorithms, etc., session handling relating to signaling procedures used to set up packet data context and negotiate associated parameters, e.g., Quality of Service, and location management relating to tracking area update processes used by the network to join terminals in case of incoming sessions. The MME 430 is coupled to a HSS (Home Subscriber Server) 432, a database that includes user subscription information, such as user identification and addressing and user profile information such as service subscription states and user-subscribed QoS information. The HSS 432 also generates security information from user identity keys for communication to entities in the network. The security information may be used for mutual network-terminal authentication and radio path ciphering and integrity protection to ensure data and signaling transmitted between the network and the terminal is neither eavesdropped nor altered.

The eNode-B 420 and the MME 430 are coupled to a serving gateway (S-GW) 440. The S-GW 440 includes circuitry 442 for establishing a termination point of the packet data interface towards the Evolved Universal Terrestrial Radio Access Network (E-UTRAN), e.g., the eNode-B providing the user plane and the control plane protocol termination towards the MP UE 410. The circuitry 442 of S-GW 440 also provides for inter-eNode handovers. The S-GW 440 serves as a local mobility anchor so that packets are routed through. The S-GW 440 is coupled to at least a first packet data network (PDN) gateway ($P-GW_1$) 450 and a second PDN gateway ($P-GW_2$) 452. The PDN gateways 450, 452 support packet filtering and policy enforcement features that apply operator-defined rules for resource allocation and usage.

A first Policy and Charging Rules Function ($PCRF_1$) node 460 is coupled to $P-GW_1$ 450 and second $PCRF_2$ node 462 is coupled to $P-GW_2$ 452. The first and second PCRFs 460, 462 manage service policy and sends QoS setting information and accounting rule information for each user session. The PCRFs 460, 462 provide operator-defined charging rules applicable to each service data flow. $P-GW_1$ 450 is coupled to a virtual private network (VPN) 470, e.g., a corporate network, and $P-GW_2$ 452 is coupled to the Internet 472.

In FIG. 4, interfaces between different nodes are labeled with association to the two personalities, P1 480, and P2 482. The prevalent mode of dual-use corporate/personal is based on connecting to two separate packet domains, e.g., the VPN 470 for the corporate partition and public Internet 472 for the personal partition. SSDA can support an IP domain for each persona.

Figure 5:
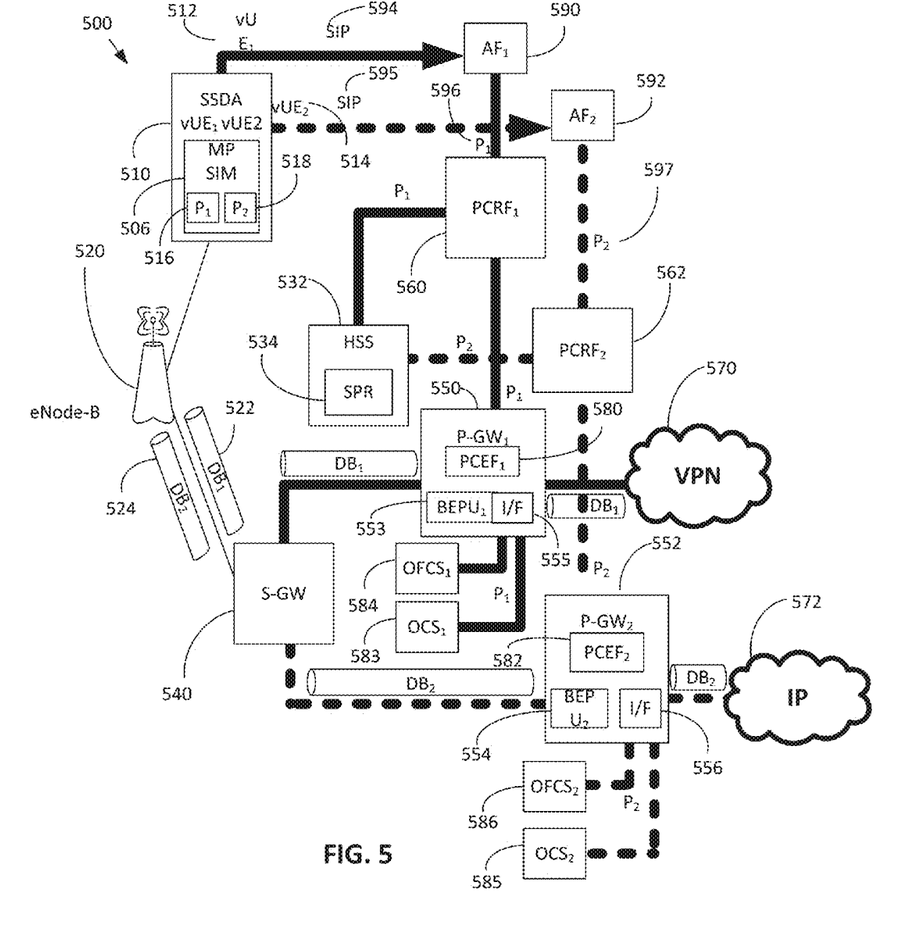
FIG. 5 illustrates the Policy and Charging Control (PCC) architecture for SSDA according to an embodiment.

FIG. 5 illustrates the Policy and Charging Control (PCC) architecture for SSDA 500 according to an embodiment. Per PDN charging capability of UTE enables tracking of persona usage. Even with one PDN, charging based on service data flows may be used to achieve per persona charging. In FIG. 5, user equipment (UE) 510 using a SSDA according to an embodiment is coupled to an eNode-B 520. The eNode-B 520 is coupled to a serving gateway (S-GW) 540. The S-GW 540 is the termination point of the packet data interface towards E-UTRAN. The S-GW 540 is coupled to at least a first packet data network (PDN) gateway ($P-GW_1$) 550 and a second PDN gateway ($P-GW_2$) 552. The S-GW 540 forwards data packets associated with UE 510 to $P-GW_1$ 550 and to $P-GW_2$ 552. $P-GW_1$ 550 and to $P-GW_2$ 552 support packet filtering and policy enforcement features that apply operator-defined rules for resource allocation and usage.

A first Policy and Charging Rules Function ($PCRF_1$) node 560 is coupled to $P-GW_1$ 550 and second $PCRF^2$ node 562 is coupled to $P-GW_2$ 552. $PCRF_1$ 560 and $PCRF_2$ 562 manage service policy and provide accounting information and QoS setting information for each user session. P-GW$_1$ 550 is coupled to a virtual private network (VPN) 570, e.g., a corporate network, and P-GW$_2$ 552 is coupled to the Internet 572. The Home Subscriber Server (HSS) 432 is the main database of the long term evolution (LTE) evolved packet core (EPC) storing subscriber information. This information includes static profiles, including identification information and dynamic information related to each Packet Data Network (PDN) context that the subscriber has established. The HSS 532 also maintains the Subscriber Profile Repository (SPR) 534. PCRF$_1$ 560 and PCRF$_2$ 562 have access to subscriber profiles stored in the SPR 534. PCRF$_1$ 560 and PCRF$_2$ 562 download a subscriber profile from the HSS 532/SPR 534 for the policy decision to be enforced.

P-GW$_1$ 550 and P-GW$_2$ 552 each include an interface (I/F) 555, 556 configured to communicate with a serving gateway (S-GW) 540 serving the SSDA UE 510 having a multiple persona (MP) SIM 506 providing a first persona 516 and a second persona 518, a policy and charging enforcement function (PCEF) entity, PCEF$_1$ 580, PCEF$_2$ 582, configured to enforce gating and QoS and to provide usage measurement to support charging, and a bearer establishment process unit (BEPU), BEPU$_1$ 553, BEPU$_2$ 554, coupled to interface 555, 556. BEPU$_1$ 553 and BEPU$_2$ 554 are configured to implement, via an LTE protocol stack, a first default bearer DB$_1$ 522 for a first virtual user equipment (vUE$_1$) 512 associated with the first persona 516 and a second default bearer DB$_2$ 524 for a second vUE$_2$ 514 associated with the second persona 518, wherein the first persona 516 and second persona 518 are provided for a single, individual user. PCEF$_1$ 580 and PCEF$_2$ 582 enforce gating and QoS for individual IP flows on the behalf of PCRF$_1$ 560 and PCRF$_2$ 562, respectively, and provide usage measurement to support charging. PCEF$_1$ 580 and PCEF$_2$ 582 work with charging systems 583, 584, 585, 586. A first and second Online Charging System (OCS$_1$, 583, OCS$_2$ 585) for credit management exchange related charging information with first and second Offline Charging Systems (OFCS$_1$ 584, OFCS$_2$ 586). Application level session information is exchanged between PCRF$_1$ 560 and PCRF$_2$ 562 and first and second application functions (AF$_1$ 590, AF$_2$ 592) using SIP-based session management. AF$_1$ 590 and AF$_2$ 592 offer access points for service applications and provide flow based charging and service related information for policy control of first IP bearer resources associated with the first persona 516 of the first virtual user equipment, vUE$_1$ 512, and second IP bearer resources associated with the second persona 518 associated with the vUE$_2$ 514. PCRF$_1$ 560 and PCRF$_2$ 562 provide charging rules and authorization information to the S-GW 540 for enforcement of bearer resources for the first persona 516 associated with the vUE$_1$ 512 and the second persona 518 associated with vUE$_2$ 514. Thus, property authorized resources are available to vUE$_1$ 512 and vUE$_2$ 514 for session-based services.

As shown in FIG. 5, a user interface command is activated on vUE$_1$ 512 and vUE$_2$ 514 via a first persona 516 and second persona 518, respectively. A first session is negotiated by vUE$_1$ 512 for accessing a virtual private network (VPN) 570, such as a corporate network. A second session is negotiated by vUE 514 for accessing the Internet 572. Each of the sessions are set up with AF$_1$ 590 and AF$_2$ 592 using a Session Initiation Protocol (SIP) 594, 595, wherein AF$_1$ 590 and AF$_2$ 592 obtain service information associated with vUE$_1$ 512 and vUE$_2$ 514 from a personal profile on the MP SIM 506 of the SSDA UE 510. AF$_1$ 590 transfers related service information obtained from vUE$_1$ 512 to PCRF$_1$ 560 so PCRF$_1$ 560 can set PCC (Policy and Charging Control) or QoS (Quality of Service) policy for the first persona P$_1$ 516, AF$_2$ 592 transfers related service information obtained from vUE$_2$ 514 to PCRF$_2$ 562 so PCRF$_2$ 562 can set PCC (Policy and Charging Control) or QoS (Quality of Service) policy for second persona P$_2$ 518.

PCRF$_1$ 560 obtains subscriber information associated with the first persona, P$_1$ 596, from Subscription Profile Repository (SPR) 534 of the HSS 532. The SPR 534 stores subscription-based policy information and bearer level charging rules for access by the first and second PCRF entities 560, 562. PCRF$_2$ 562 obtains subscriber information associated with the second persona, P$_2$ 597, from SPR 534 of the HSS 532. Based on the obtained subscriber information, PCRF$_1$ 560 and PCRF$_2$ 562 either accept the negotiation between vUE$_1$ 512 and AF$_1$, 590 and between vUE$_2$ 514 and AF$_2$ 592, respectively, or provide acceptable parameters via feedback to vUE$_1$ 512 and vUE$_2$ 514.

Policy and Charging Enforcement Functions (PCEF$_1$ 560, PCEF$_2$ 562) exist in each of P-GW$_1$ 550 and P-GW$_2$ 552. PCRF$_1$ 560 provisions the PCC rule and the event triggers for vUE$_1$ 512 to PCEF$_1$ 560 in P-GW$_1$ 550 to perform policy and charging control for the session with vUE$_1$ 512. PCRF$_2$ 562 provisions the PCC rule and the event triggers for vUE$_2$ 514 to PCEF$_2$ 562 in P-GW$_2$ 552 to perform policy and charging control for the session with vUE$_2$ 514. Thus, PCRF$_1$ 560 can implement control functions just by interfacing with P-GW$_1$ 550 and PCRF$_2$ 562 can implement control functions just by interfacing with P-GW$_2$ 552. PCEF$_1$ 560 is coupled through the offline charging system (OFCS$_1$) 584 and/or online charging system (OCS$_1$) 583, and PCEF$_2$ 562 is coupled to the OFCS$_2$ 586 and/or OCS$_2$ 585. Using OFCS$_1$ 584 and/or OCS$_1$ 583, and OFCS$_2$ 586 and/or OCS$_2$ 585, respectively, PCEF$_{1\,560}$ and PCEF$_2$ 562 generate charging data records.

When establishing the respective bearers, DB$_1$ 522, DB$_2$ 524, PCEF$_1$ 580 and PCEF$_2$ 582 perform the QoS authorization in accordance with the rules sent by PCRF$_1$ 560 and PCRF$_2$ 562, and perform the gating control in accordance with the enforcement of AF$_1$ 590 and AF$_2$ 592. According to the charging rule sent by PCRF$_1$ 560 and PCRF$_2$ 562, PCEF$_1$ 580 and PCEF$_2$ 582 enforce the corresponding charging operation of the service data flow, and the charging is either online charging or offline charging. If the charging is the online charging, PCEF$_1$ 580 performs credit management with OCS$_1$ 583 and PCEF$_2$ 582 performs credit management with OCS$_2$ 585 based on time, traffic volume or chargeable events. If it is the offline charging, the relevant charging information is exchanged between the PCEF$_1$ 580 and OFCS$_1$ 584 and between PCEF$_2$ 582 and OFCS$_2$ 586, P-GW$_1$ 550 then provides vUE$_1$ 512 gateway access to the packet data network, i.e., the virtual private network (VPN) 570, such as a corporate network. P-GW$_2$ 552 provides vUE$_2$ 514 gateway access to the packet data network, i.e., the Internet 572.

Accordingly, in FIG. 5, two IP domains with respective default bearers, DB$_1$ 522, DB$_2$ 524, cross two PDN gateways, P-GW$_1$ 550 and P-GW$_2$ 552, to two IP addresses on the UE 510. In this case, an SSDA UE 510 supports multiple P-GW connections. Depending on the operator's considerations, one PCRF entity can serve P-GW$_1$ 550 and P-GW$_2$ 552. S-GW 540 aggregates signaling, control and media traffic from P-GW$_1$ 550 and P-GW$_2$ 552 and routes to the eNode-B 520 associated with the SSDA UE 510. With a single-transceiver, each persona may communicate through the same public land mobile network (PLMN) (not shown). The SIM 506 of the SSDA UE 510 stores the same PLAIN list and during the system acquisition phase, SSDA UE 510 retrieves the PLMN ID for each persona. Separate default bearers, DB$_1$ 522, DB$_2$ 524 may be set up for P-GW$_{1\,550}$ and P-GW$_2$ 552 to provide for the possibility of always-on IP connectivity of each persona, $P_1$ 516, $P_2$ 518, e.g., simultaneous IP connectivity. To allow multiple PDN connections, SSDA supports UE-initiated connectivity establishment. The procedure leads to establishment/modification/release of separate bearers, $DB_1$ 522, $DB_2$ 524, per PDN, each associated with its respective persona, $P_1$ 516, $P_2$ 518.

Figure 6:
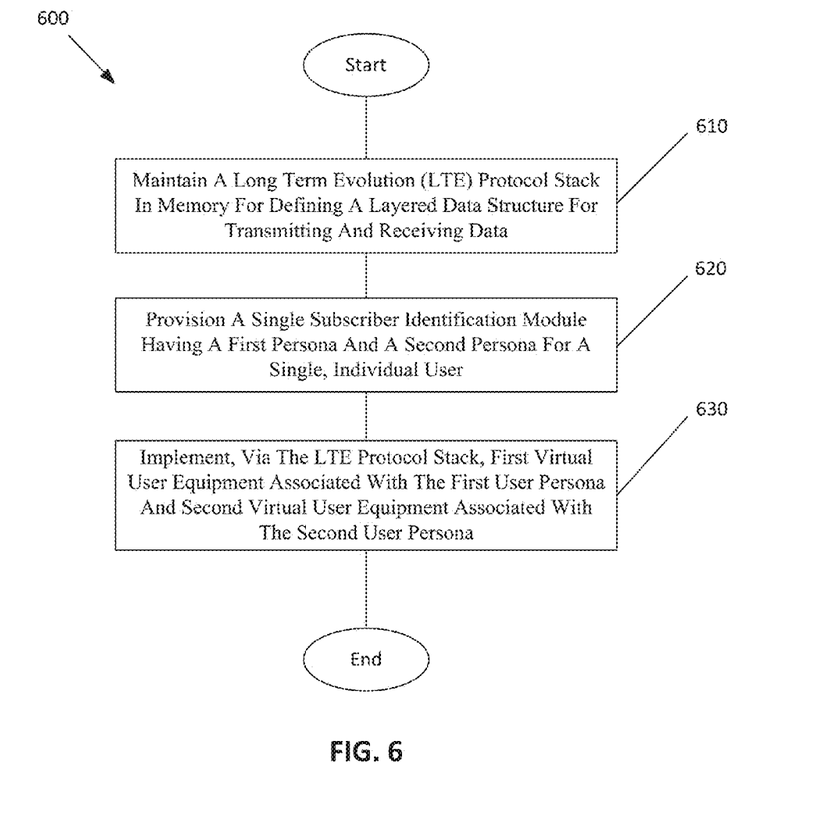
FIG. 6 is a flow chart of a method for providing a network architecture for dual active personae according to an embodiment.

FIG. 6 is a flow chart 600 of a method for providing a network architecture for dual active personae according to an embodiment. In FIG. 6, a long term evolution (LTE) protocol stack is maintained in memory for defining a layered data structure for transmitting and receiving data 610. A single subscriber identification module provisions a first persona and a second persona 620. First virtual user equipment associated with the first persona and second virtual user equipment associated with the second persona are implemented via the LTE protocol stack 630.

The above detailed description includes references to the accompanying drawings, which form a part of the detailed description. The drawings show, by way of illustration, specific embodiments that may be practiced. These embodiments are also referred to herein as "examples." Such examples can include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more," in this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples for one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is part of any claim. Rather, embodiments may include less than all features of those disclosed in a particular example. Thus, the following claims are hereby incorporated into the Detailed Description, with each claim standing on its own as a separate embodiment. The scope of the embodiments disclosed herein should be determined with reference to the appended claims, along with the full scope of equivalents to which such claims are entitled.

What is claimed is:

1. A user equipment, comprising:
   a memory configured to store Long Term Evolution (LTE) Protocol instruction wherein said LTE Protocol is a layered data structure for transmitting and receiving data;
   a single Subscriber Identification Module (SIM) configured to store a first personae data and second personae data for a single individual user;
   a processor coupled to said memory and said single SIM, wherein when said first personae data is selected by the single individual user then executing the LTE protocol instructions to transmit and received the data as a first virtual user (vUE) utilizing first default bearer services, and when the second personae data is selected by the single individual user, executing the LTE protocol instructions to transmit and received the data as a second virtual user utilizing second default bearer services.

2. The user equipment of claim 1, wherein the first and the second personae are associated with a first and second IP address, respectively.

3. The user equipment of claim 1, further comprising a single transceiver coupled to the processor for transmitting and receiving data for the first vUE associated with the first personae and the second vUE associated with the second personae.

4. A serving gateway (S-GW), comprising:
   a first interface with a first packet gateway;
   a second interface with a second packet gateway; and
   a processor configured to:
      establish a first bearer service for a first virtual user equipment (vUE) associated with a first personae via the first interface with the first packet gateway;
      establish a second bearer service for a second vUE associated with a second personae via the second interface with the second packet gateway; and
      provide simultaneous Internet Protocol (IP) connectivity for the first vUE to a first packet data network using the first established bearer service according to the first personae and for the second vUE to a second packet data network using the second established bearer service according to the second personae.

5. The serving gateway of claim 4, wherein the processor is further configured to establish a packet data interface termination point, at an Evolved Node B (eNode-B) servicing the UE, for a user plane and a control plane of a User Equipment (UE).

6. The serving gateway of claim 5, wherein the processor is further configured to forward data packets associated with the first personae of the vUE to a first packet data network gateway ($P\text{-}GW_1$) using the first bearer service, and forward data packets with the second personae of the UE to a second packet data network gateway ($P\text{-}GW_2$) using the second bearer service, wherein a first Policy and Charging Rules Function ($PCRF_1$) processor is coupled to $P\text{-}GW_1$ and a second $PCRF_2$ processor is coupled to $P\text{-}GW_2$.

7. The serving gateway of claim 5, wherein the processor is further configured to aggregate signaling, control and media traffic from $P\text{-}GW_1$ and $P\text{-}GW_2$, and route the aggregated signaling, control and media traffic to the eNode-B.

8. The serving gateway of claim 5, wherein the processor is further configured to forward data packets received via the first and second bearer services, associated with the first and second personae respectively, to a first and second Packet Data Network Gateway (P-GW), respectively.

9. The serving gateway of claim 8, wherein the data packets are forwarded to a first and a second P-GW for packet filtering and policy enforcement based on operator-defined rules for resource allocation and usage.

10. The serving gateway of claim 5, wherein the processor is further configured to act as a mobility anchor for the user plane during inter-eNodeB handovers.

11. The serving gateway of claim 5 wherein the processor is further configured to receive information from a Mobility Management Entity (MME) for performing bearer service management functions associated with the first established bearer service having a the first personae and the second established bearer service having the second personae.

12. A packet data network gateway (P-GW), comprising:
an interface configured to send packets to and receive packets from a serving gateway (S-GW) serving a user equipment having a single subscriber identification module providing a first personae and a second personae;
a Policy and Charging Enforcement Function (PCEF) Module configured to restrict access to a packet network based on Quality of Service (QoS) and to measure the usage of the (packet network in order to collect records for charging user usage of the packet data network; and
a bearer establishment processing unit coupled to said interface and the PCEF Module wherein the bearer establishment processing unit is configured to implement a LTE protocol stack to transmit and received the packets as a first virtual user utilizing first default bearer services associated with a first person and to transmit and received the packets as a second virtual user utilizing second default bearer services as a second person wherein the first and second person are a same individual user.

13. The P-GW of claim 12 further comprising an offline charging system (OFCS) module for providing charging information for network resource usage concurrently with resource usage to generate charging data records.

14. The P-GW of claim 13 further comprising an online charging system (OCS) module for providing credit management based on time, traffic volume or chargeable events.

15. The P-GW of claim 14, wherein the interface is further configured to obtain subscription-based policy information and bearer service level charging rules stored in a Subscription Profile Repository (SPR) to enforce resources associated with the first virtual user utilizing first default bearer services associated with a first person and to enforce resources associated with the second virtual user utilizing second default bearer services as a second person, wherein the first and second person are a same individual user.

16. A method for single user to send packets to two separate packet data networks using two different personae said method comprising operations to:
transmit and receive Long Term Evolution (LTE) Protocol packets to a first packet data network, by user equipment when first personae selected on the user equipment, as a first virtual user (vUE) utilizing first default bearer services associated with a first packet gateway;
transmit and receive Long Term Evolution (LTE) Protocol packets to a second packet data network, by the user equipment when the second personae selected, as a second vUE utilizing second default bearer services; wherein the first personae and the second personae are associated with a single user.

17. The method of claim 16 further comprising operations for creating a first session for the first vUE with a corporate network, and creating a second session for the second vUE with a packet data network using a personal profile.

18. The method of claim 16 further comprising operations for aggregating signaling, control and media traffic from a first and second Packet Data Network (PDN) gateway, and routing the aggregated signaling, control and media traffic from a first PDA to the first vUE and the aggregated signaling, control and media traffic from the second PDA to the second vUE.

19. The method of claim 16 further comprising operations for transmitting and receiving data for the first vUE associated with the first personae and the second vUE associated with the second personae, using a single transceiver.

* * * * *

UNITED STATES PATENT AND TRADEMARK OFFICE
CERTIFICATE OF CORRECTION

PATENT NO. : 9,014,091 B2
APPLICATION NO. : 13/625127
DATED : April 21, 2015
INVENTOR(S) : Masoud Sajadieh Page 1 of 1

It is certified that error appears in the above-identified patent and that said Letters Patent is hereby corrected as shown below:

In the claims

In column 12, line 66, in Claim 7, delete "P-$GW_1$and" and insert --P-$GW_1$ and--, therefor In column 13, line 17, in Claim 11, after "having", delete "a", therefor In column 13, line 27, in Claim 12, delete "(packet" and insert --packet--, therefor Signed and Sealed this
Fourteenth Day of June, 2016

Michelle K. Lee
*Director of the United States Patent and Trademark Office*